3,112,229
FUEL CELLS

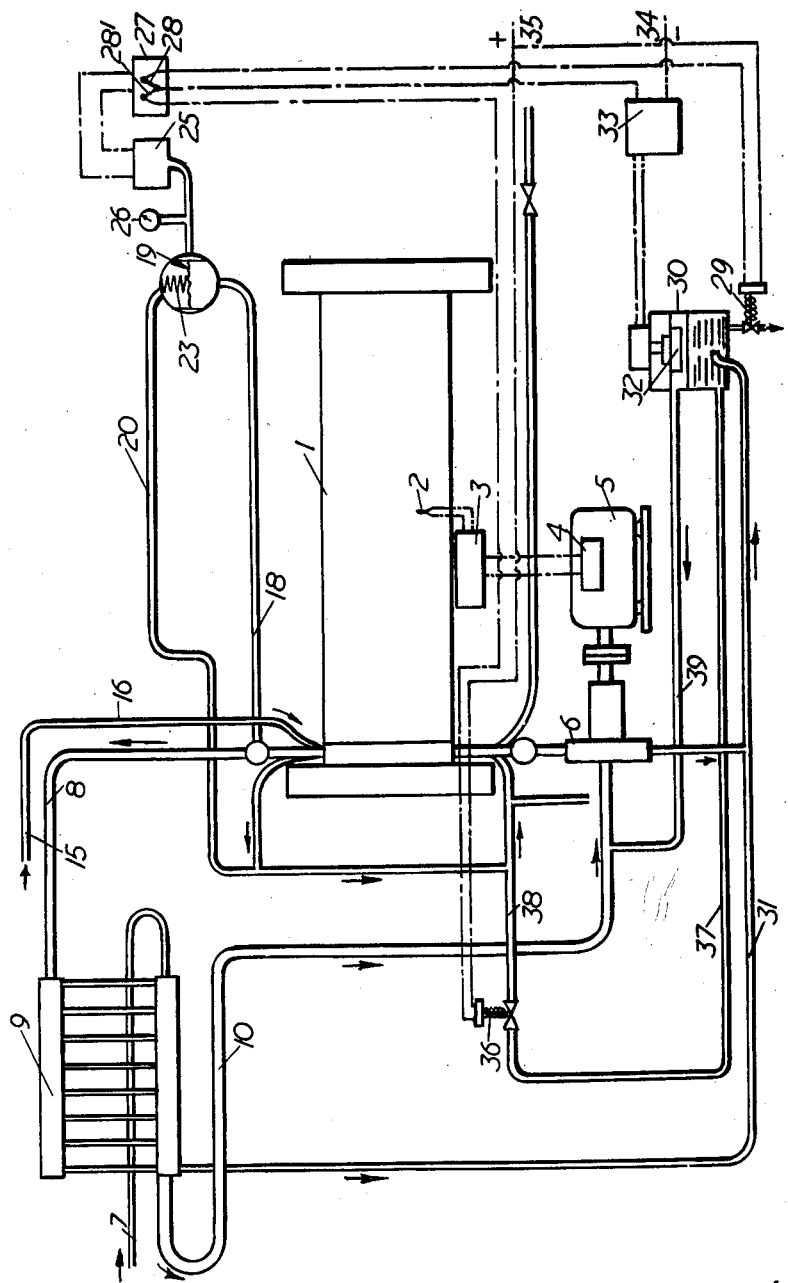

Francis T. Bacon, Little Shelford, and John C. Frost, Stapleford, England, assignors to National Research Development Corporation, London, England
Filed Oct. 11, 1961, Ser. No. 144,421
Claims priority, application Great Britain Oct. 17, 1960
5 Claims. (Cl. 136—86)

This invention relates to fuel cells of the hydrogen/oxygen type. When such cells are used for the production of electrical power, hydrogen and oxygen are consumed to form water which dilutes the electrolyte. The water is formed in the vicinity of the hydrogen electrode and at the operating temperature of the cell it can evaporate very easily into the hydrogen in contact with the electrode. In order to maintain the concentration of the electrolyte, the water vapour may be removed from the cell by circulating this hydrogen and cooling it to condense the water vapour at a point outside the cell.

One form of system for achieving this result is described in U.S. Patent 3,002,039. As described in this specification, the circulation of the hydrogen is effectively controlled by the differential pressure existing between the hydrogen and the electrolyte. A decrease in the differential pressure caused by an increasing volume of electrolyte operates a valve to release condensate to the atmosphere. Prior to this release the volume of condensate obstructs the circulation of hydrogen and when the condensate is released, the circulation of hydrogen restarts so as to remove water from the cell. This causes the differential pressure to increase again and the circulation of hydrogen continues until it is again interrupted by the volume of condensate which has collected. In this way the hydrogen is circulated intermittently and the differential pressure and hence the volume and concentration of the electrolyte is maintained within predetermined limits.

During the operation of the cell a considerable quantity of heat is generated and cooling is necessary. A degree of cooling is, of course, produced by the circulation of the hydrogen which is cooled to enable the water vapour to be condensed, and by the extraction of latent heat as a result of the formation of steam. In general, however, this is not sufficient and in practice it is found that further cooling is required.

According to the present invention the hydrogen circulation system includes means for circulating the hydrogen which is controlled in accordance with the temperature of the cell and also includes a valve controlled in accordance with the differential pressure between the hydrogen and the electrolyte in the cell so as to return to the cell any water vapour removed from the cell in excess of that formed in the cell. In this way the temperature of the cell is maintained within the required limits merely by circulation of the hydrogen without the need for any other form of cooling. Since the passage of cooled hydrogen produces internal cooling in the cell, it is more effective than any form of external cooling and, moreover, enables the cooling and the removal of the water vapour to be achieved simultaneously.

As mentioned above, the circulation of the hydrogen to an extent sufficient merely to remove the water vapour formed does not produce sufficient cooling. Conversely, the circulation of hydrogen to produce sufficient cooling removes more water vapour from the cell than is formed within the cell under normal operating conditions and when using electrolyte of normal concentration, that is to say up to 45 percent or even 50 percent by weight of the normal electrolyte, caustic potash. The excess water vapour removed must then be returned to the cell as just mentioned and this in its turn produces a small amount of additional internal cooling. The removal of excess water vapour from the cell causes the differential pressure between the hydrogen and the electrolyte to rise and when this has reached a predetermined value, the valve is opened to return condensate to the cell and thus reduces the pressure again. When the pressure has dropped to a value corresponding to normal operation of the cell, the valve closes again. Thus, of the water vapour removed from the cell some is returned again while the remainder corresponding in volume to that formed within the cell is released to atmosphere.

The differential pressure between the hydrogen and the electrolyte may act on a diaphragm which operates an electric switch to control the valve for returning the condensate to the cell. Preferably a receiver for the condensate from the cell is fitted with a level detector which controls the release of condensate from the receiver when a predetermined level is reached by operating either the valve for returning the condensate to the cell or a valve for discharging the condensate from the system according to the setting of a selector relay controlled by the diaphragm-operated switch. Consequently, if the differential pressure rises the selector relay is controlled appropriately but no action occurs until the level in the condensate receiver rises sufficiently. When the predetermined level is reached, the level detector causes condensate to be released and this released condensate is returned to the cell as long as the differential pressure is sufficiently high to maintain the diaphragm-operated switch in the operated position. As soon as sufficient condensate has been returned to the cell, however, the differential pressure will drop and the diaphragm-operated switch will cause the selector relay to change over to the alternative position so that the remainder of the condensate will be discharged from the system.

As an alternative to the use of a selector relay the switch controlled by the differential pressure may operate the valve directly so that condensate is caused to flow into the cell as soon as the differential pressure reaches its predetermined value and regardless of the level of condensate in the receiver. When the level of condensate reaches its upper limit, it is then automatically discharged to atmosphere until the lower limit is reached. With either of these forms of control the excess water vapour removed from the cell is returned under the control of the differential pressure while the remainder is released to atmosphere.

As a result of this form of control the net amount of water vapour removed from the cell is equal to that which is formed within the cell and is independent of the period during which the hydrogen is circulated. As mentioned above, the circulation of the hydrogen is controlled by the temperature of the cell and this may be achieved by means of a blower driven by an electric motor operated by a relay controlled by a thermocouple in accordance with the temperature of the cell. In other words, the duration of the hydrogen circulation is controlled by the cooling requirements of the cell while the net amount of water vapour removed is controlled in accordance with the amount formed.

A system in accordance with the invention will now be described in more detail with reference to the accompanying drawing which is a schematic diagram.

In practice, a number of individual cells are connected in series and a pack of such cells is shown as 1. In general, all the cells will operate at substantially the same temperature and a thermocouple 2 is inserted to measure the temperature of a single cell. This operates through a relay 3 and a starter 4 to control an electric motor 5 (the supply to which is not shown) to drive a blower 6 which circulates the hydrogen. The relay 3 is set so that the motor 5 starts when an upper limit of temperature is reached and stops again when the temperature falls to a lower limit. Hydrogen is admitted to the system at 7 and the circuit for the circulating hydrogen passes from the cell pack 1 along a pipe 8 to a condenser 9 where the hydrogen is cooled and the water vapour carried by it is condensed. The incoming hydrogen flows into the condenser 9 and the circuit continues via a pipe 10 and the blower 6 back to the cell pack 1. Oxygen is supplied to the cell pack 1 through an inlet 15 and a pipe 16.

A pipe 18 leads from the hydrogen pipe 8 to one side of a diaphragm 19 to the other side of which the electrolyte is led by way of a pipe 20.

The pressure of the electrolyte is augmented by a small spring 23 to ensure that under conditions of balance the pressure of the electrolyte is slightly less than that of the hydrogen.

The circulation of the hydrogen under the control of the temperature of the cell removes excess water vapour from the cell and causes the differential pressure between the hydrogen and the electrolyte to rise. This acts on the diaphragm 19 to operate a switch 25 and a differential pressure gauge 26. When the differential pressure reaches a preset upper limit, the switch 25 operates a selector relay 27 having a changeover contact 28. In the full line position of this contact it completes a circuit to a solenoid valve 29 which controls the release of condensate to atmosphere from a receiver 30 into which condensate flows from the condenser 9 by way of a pipe 31. The receiver 30 is fitted with a level detector in the form of a capacitance probe 32 connected to a controller 33. When the level in the receiver 30 reaches a preset upper limit, the controller 33 completes a circuit from one pole 34 of an electrical supply through the selector relay 27 and with the changeover contact in the full line position through the solenoid valve 29 back to the other pole of the supply at 35. This opens the solenoid valve 29 to release condensate to atmosphere until the level drops to a point at which the controller 33 opens the circuit again to close the valve 29.

If, however, the differential pressure between the hydrogen and electrolyte is sufficient to change over the contact 28 to its dotted line position shown as 28', the operation of the controller 33 is to complete a circuit through a second solenoid valve 36 so as to allow condensate to flow from the receiver 30 through a pipe 37, the valve 36 and then through a further pipe 38 into the pipe 20 forming part of the electrolyte circuit. In this way the electrolyte is diluted and its volume is increased so as to reduce the differential pressure. If the differential pressure returns to its lower limit while the controller 33 maintains the circuit closed, the selector relay 27 will change over so as to close the valve 36 and open the valve 29 and thus discharge the remainder of the condensate to atmosphere. A pipe 39 extends between the pipe 10 and the receiver 30 so that the pressure of the hydrogen acts on the condensate in the receiver 30 and thus forces it upwardly through the valve 36 when the latter is open.

When the cell pack cools down at the completion of operation, the electrolyte contracts and a considerable volume of water needs to be added to counteract this contraction. The receiver 30 therefore requires to be large enough for this purpose and moreover during cooling it may be necessary to open the circuit to the controller 33 to allow the level of condensate to fall below the normal minimum. As a further precaution the circuit to the solenoid valve 29 may be opened to ensure that none of the condensate is released to atmosphere.

We claim:

1. In a hydrogen-oxygen fuel cell having a hydrogen circulation system, a condenser for steam carried by the circulating hydrogen, an electrolyte circulation system, means for measuring the differential pressure between the hydrogen and the electrolyte in said circulation systems, a receiver for condensate from said condenser and a valve controlled by said pressure measuring means for releasing condensate from said receiver to the atmosphere, the improvement which comprises:

(a) thermometer means for measuring the operating temperature of the cell,
   (b) means controlled by said thermometer means to regulate circulation of hydrogen in the cell's hydrogen circulation system,
   (c) a fluid connection between the cell's condensate receiver and its electrolyte circulation system for flow of condensate collected from hydrogen circulated under regulation of said means (b) from said receiver to said electrolyte circulation system, and
   (d) valve means for regulating flow of condensate through said fluid connection (c) automatically in response to a predetermined pressure condition between hydrogen and electrolyte existing in the cell.

2. In a hydrogen-oxygen fuel cell having a hydrogen circulation system, a condenser for steam carried by the circulating hydrogen, an electrolyte circulation system, means for measuring the differential pressure between the hydrogen and electrolyte in said circulation systems, a receiver for condensate from said condenser and a condensate valve controlled by said means for releasing condensate from said receiver to atmosphere, the improvement which comprises:

(a) thermometer means for measuring the operating temperature of the cell,
   (b) a blower for forcing hydrogen through the hydrogen circulation system,
   (c) a control for regulating the operation of said blower in accordance with the temperature measured by said thermometer means,
   (d) a liquid level detector in the cell's condensate receiver which collects water condensed from hydrogen circulated by said blower,
   (e) a tubular connection between said condensate receiver and the cell's electrolyte circulation system,
   (f) a valve in said tubular connection for regulating flow of condensate through the tubular connection, and
   (g) means connecting said level detector to the cell's differential pressure measuring means and said valve (f) for operating the valve upon occurrence of predetermined combinations of liquid level in said receiver and pressure differential between the hydrogen and electrolyte.

3. A fuel cell according to claim 2 wherein said valve (f) is a solenoid valve, said level detector is electrically connected to a selector relay controlled by a diaphragm-operated switch and said relay is electrically connected to said solenoid valve.

4. A fuel cell according to claim 2 wherein said thermometer means is a thermocouple, said blower is driven by an electric motor and a relay is electrically connected to said thermocouple and electric motor to turn the motor off and on in accordance with the electrical potential output of said thermocouple.

5. A method of operating a hydrogen-oxygen fuel cell to obtain effective cooling of the cell and elimination from the cell of excess water formed in the cell which comprises:

(a) forcibly withdrawing hydrogen from the electrode zone of the cell and recycling it in a closed circuit external of said zone back to said zone,
   (b) thermoelectrically measuring the operating temperature of the cell,
   (c) employing the electrical potential output of step (b) to regulate the withdrawal and recycling of hydrogen of step (a),
   (d) substantially continuously measuring the pressure differential between hydrogen and electrolyte in said cell,
   (e) condensing a greater quantity of water from said recycling hydrogen in step (a) than is formed in the cell, (f) accumulating the water condensed in step (e),
(g) detecting the quantity of the accumulated water,
(h) returning some of said accumulated water to said electrode zone when said pressure differential of step (d) is above a predetermined value, and
(i) ejecting some of said accumulated water from the cell when said pressure differential of step (d) is below said predetermined value while the quantity of water as detected by step (g) is above a predetermined amount.

References Cited in the file of this patent

UNITED STATES PATENTS 3,002,039    Bacon    Sept. 26, 1961

FOREIGN PATENTS 667,298    Great Britain    Feb. 27, 1952